(12) United States Patent
DeCaprio

(10) Patent No.: US 10,269,390 B2
(45) Date of Patent: Apr. 23, 2019

(54) GAME VIDEO PROCESSING SYSTEMS AND METHODS

(71) Applicant: David M. DeCaprio, Austin, TX (US)

(72) Inventor: David M. DeCaprio, Austin, TX (US)

( * ) Notice: Subject to any disclaimer, the term of this patent is extended or adjusted under 35 U.S.C. 154(b) by 0 days.

(21) Appl. No.: 15/172,116

(22) Filed: Jun. 2, 2016

(65) Prior Publication Data

US 2016/0365121 A1 Dec. 15, 2016

Related U.S. Application Data

(60) Provisional application No. 62/174,335, filed on Jun. 11, 2015.

(51) Int. Cl.
| | |
|---|---|
| H04N 9/80 | (2006.01) |
| G11B 27/036 | (2006.01) |
| G06T 11/60 | (2006.01) |
| G06K 9/00 | (2006.01) |
| H04N 9/82 | (2006.01) |
| G11B 27/28 | (2006.01) |
| G06K 9/46 | (2006.01) |
| G06K 9/62 | (2006.01) |

(52) U.S. Cl.
CPC ........ *G11B 27/036* (2013.01); *G06K 9/00724* (2013.01); *G06K 9/00744* (2013.01); *G06K 9/00765* (2013.01); *G06K 9/46* (2013.01); *G06K 9/6267* (2013.01); *G06T 11/60* (2013.01); *G11B 27/28* (2013.01); *H04N 9/8205* (2013.01)

(58) Field of Classification Search
CPC .......................... G11B 27/036; G06K 9/00724
See application file for complete search history.

(56) References Cited

U.S. PATENT DOCUMENTS

| | | | | |
|---|---|---|---|---|
| 2003/0081937 | A1* | 5/2003 | Li | A63B 24/0003 386/241 |
| 2008/0062318 | A1* | 3/2008 | Ellis | H04N 5/44543 348/564 |
| 2009/0213270 | A1* | 8/2009 | Ismert | G06F 17/30799 348/575 |
| 2015/0131845 | A1* | 5/2015 | Forouhar | G06K 9/00724 382/100 |
| 2016/0105634 | A1* | 4/2016 | Marchese | H04N 5/91 386/241 |

* cited by examiner

*Primary Examiner* — Thai Q Tran
*Assistant Examiner* — Girumsew Wendmagegn
(74) *Attorney, Agent, or Firm* — Cesari & Reed LLP; R. Michael Reed

(57) ABSTRACT

In some embodiments, a video processing system may be configured to process a video of a sporting event or match to determine a start point and an end point of each of a plurality of events within the match. The video processing system may automatically determine data associated with each event of the plurality of events based on the video and store the data in a memory. In some embodiments, the video processing system may segment the video into a plurality of video clips such that each video clip corresponds to one of the events of the plurality of events.

15 Claims, 7 Drawing Sheets

GAME VIDEO PROCESSING SYSTEMS AND METHODS

CROSS-REFERENCE TO RELATED APPLICATION(S)

This application is a non-provisional application of and claims priority to U.S. Provisional Patent Application No. 62/174,335 filed on Jun. 11, 2015 and entitled "Game Video Processing Systems and Methods", which is incorporated herein by reference in its entirety.

FIELD

The present disclosure is generally related to processing video data, and more particularly to computer-aided methods and systems configured to process video of athletic games and matches to produce statistics and to provide information to a user, such as a player or a coach.

BACKGROUND

An increasing number of people own and use digital video recording devices, such as video recorders or tablet computers or smart phones with video capture capability, to capture videos that document events in their lives. Recently, applications have been developed for training purposes, allowing a coach to capture short video segments of a practice session and to interact with the video segments for the purpose of diagnosing physical mistakes and for breaking down specific movements for a trainee.

SUMMARY

In some embodiments, a video processing system may include a processor configured to process video data including a sporting match and a memory accessible to the processor. The memory can be configured to store instructions that, when executed, cause the processor to determine a start point and an end point of each of a plurality of events within the video of the sporting match and automatically determine data associated with each event of the plurality of events based on the video. The instructions may further cause the processor to store the determined data and the video data in the memory.

In other embodiments, a video processing system may include a processor and a memory accessible to the processor. The memory may be configured to store instructions that, when executed, cause the processor to receive a video of a sporting match, the video including a sequence of frames and determine a plurality of events in the sequence of frames based on movement within the sequence of frames. Each event may correspond to a subset of frames of the sequence of frames. The instructions may further cause the processor to determine an outcome of each event of the plurality of events and selectively overlay a descriptor indicating the outcome of a selected event of the plurality of events within the subset of frames.

In still other embodiments, a method may include receiving, at a computing device, a video of a sporting match. The video may include a sequence of frames. the method may further include automatically determining, using a processor of the computing device, a plurality of events within the sequence of frames. Each event may correspond to a subset of frames of the sequence of frames. The method may also include determining an outcome of each event of the plurality of events and selectively inserting a descriptor within the subset of frames for each event of the plurality of events. The descriptor can indicate the determined outcome of the event.

BRIEF DESCRIPTION OF THE DRAWINGS

In the following discussion, the same reference numbers are used in the various embodiments to indicate the same or similar elements.

DETAILED DESCRIPTION OF ILLUSTRATIVE EMBODIMENTS

In the following detailed description of embodiments, reference is made to the accompanying drawings which form a part hereof, and which are shown by way of illustrations. It is to be understood that features of various described embodiments may be combined, other embodiments may be utilized, and structural changes may be made without departing from the scope of the present disclosure. It is also to be understood that features of the various embodiments and examples herein can be combined, exchanged, or removed without departing from the scope of the present disclosure.

In accordance with various embodiments, the methods and functions described herein may be implemented as one or more software programs running on a computer processor or controller. In accordance with various embodiments, the methods and functions described herein may be implemented as one or more software programs running on a computing device, such as a tablet computer, smartphone, personal computer, server, or any other computing device. Dedicated hardware implementations including, but not limited to, application specific integrated circuits, programmable logic arrays, and other hardware devices can likewise be constructed to implement the methods and functions described herein. Further, the methods described herein may be implemented as a device, such as a computer readable storage medium or memory device, including instructions that when executed cause a processor to perform the methods.

Embodiments of systems, computing devices, and methods are described below that can be configured to process video data to identify a plurality of events within a video including a sequence of frames. Each event may correspond to a subset of frames from the sequence. The system may be configured to analyze each event to determine data, which may be presented within the video data. In some embodiments, the data may include an outcome, and the outcome may be presented in at least some of the frames associated with the event. In an example, the outcome of a particular point or event of a tennis match may be shown within the video beginning with one of the first frames of a subset of the frames that correspond to the event.

Figure 1:
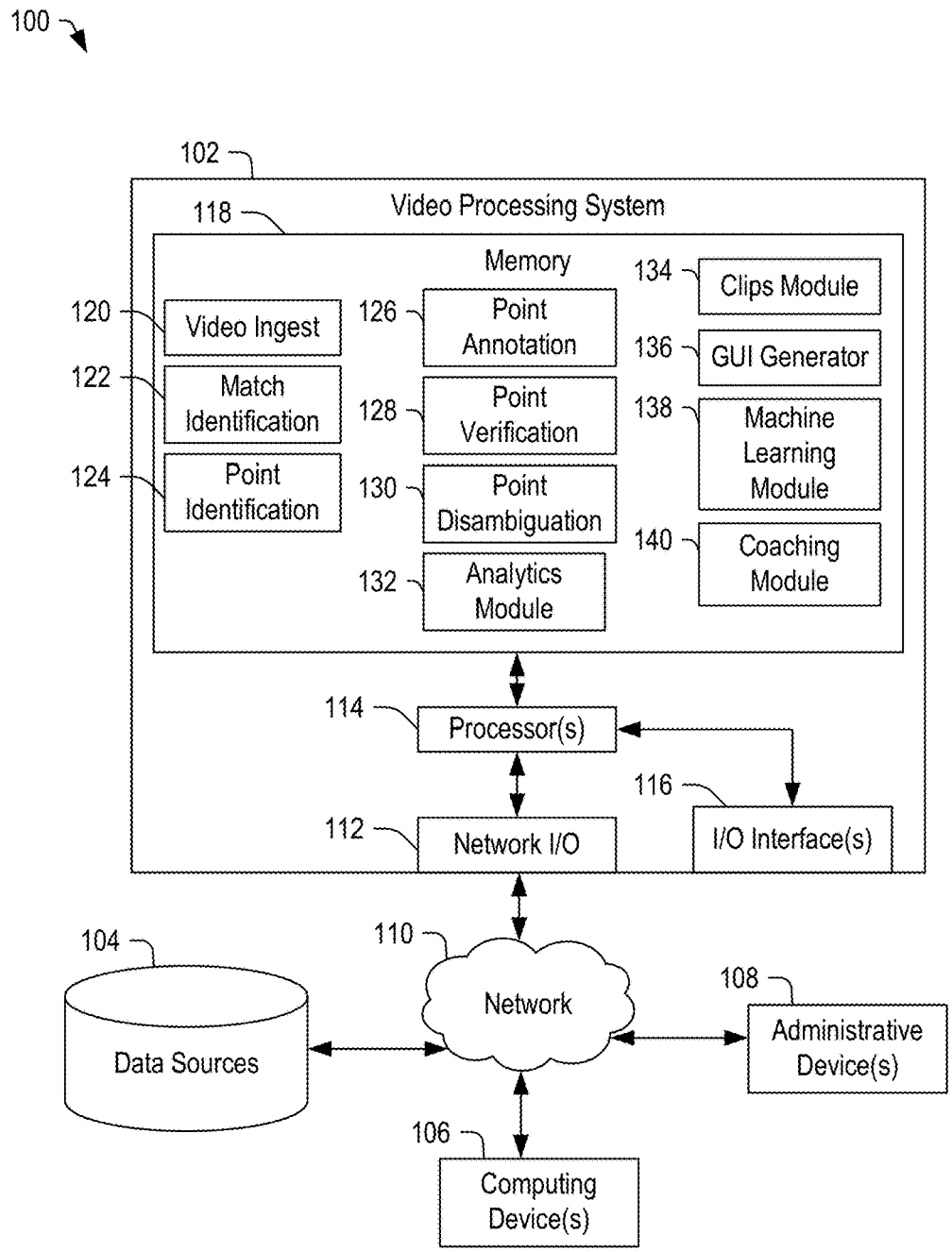
FIG. 1 is a block diagram of a system configured to process game videos, in accordance with certain embodiments of the present disclosure.

FIG. 1 is a block diagram of a system 100 configured to process game videos, in accordance with certain embodiments of the present disclosure. The system 100 may include a video processing system 102, which may communicate with one or more data sources 104, one or more computing device 106, and one or more administrative devices 108 through a network 110, such as the Internet. The one or more data sources 104 may include data storage devices that may store video data and other associated data. The one or more computing devices 106 may include user devices, which may be accessed by a user to interact with a web page or other interface of the video processing system 102. The one or more administrative devices 108 may include a computing device accessible by a user to interact with a web page of the video processing system 102 to view, annotate, and optionally correct information determined by the video processing system 102.

In some embodiments, the video processing system 102 may include a network input/output (I/O) interface 112, which may be communicatively coupled to the network 110. The video processing system 102 may further include one or more processors 114 coupled to the network I/O interface 112, to one or more I/O interfaces 116, and one or more memory devices, such as a non-volatile memory 118. The one or more I/O interfaces 116 may include interfaces such as a universal serial bus (USB) interface, a touchscreen interface, a display interface, other input interfaces, other output interfaces, or any combination thereof.

The memory 118 may include data and instructions that, when executed, may cause the one or more processors 114 to perform a variety of functions. In some embodiments, the memory 118 may include a video ingest module 120 that, when executed, may cause the processor 114 to receive and upload video data for processing. In some embodiments, the video ingest module 120 may cause the processor 114 to retrieve the video data from one or more data sources 104, such as a database, an attached thumb drive, a social media website, or another source. In some embodiments, the video ingest module 120 may cause the processor 114 to provide a graphical user interface to a computing device (such as one of the computing devices 106 or one of the administrative devices 108) via the network 110. In other embodiments, the video ingest module 120 may cause the processor 114 to retrieve the video data from a data storage, such as a network data storage accessible via the Internet.

The memory 118 may further include a match identification module 122 that, when executed, may cause the processor 114 to identify the boundaries of a particular match, such as a game. Such games may include tennis matches, baseball games, softball games, ping pong, hockey matches, soccer matches, or other games. The match identification module 122 may include particular rules or expectations for an arrangement of people and items within the ingested video, such as the position of players in a tennis match at the start of the match. The match identification module 122 may cause the processor to insert markers within the video to indicate the boundaries of the match. In a particular example, the match identification module 122 may be configured to identify a subset of frames within the video that correspond to the match. As used herein, the term "match" refers to a complete game, as opposed to a subset of the complete game. For example, a tennis match may be comprised of games, which may be grouped into sets, the winner of which determines the winner of the match (the complete game).

The memory 118 may further include a point identification module 124 that, when executed, may cause the processor 114 to determine a beginning point and an end point within the video for each point (or event) within the match. As used herein, the term "point" may refer to any discrete event within the match. A particular point within a match may correspond to a subset of frames within the video. For example, within a tennis match, a point may refer to a smallest subdivision of a tennis match, the completion of which alters the score. In a baseball game, the term "point" or "event" may refer to a plate appearance by a particular batter, which results in either the batter reaching base safely or the batter being ruled out. Alternatively, the "event" in a baseball game may refer to a particular pitch, such that each at bat may be comprised of one or more discrete events. Other embodiments are also possible.

Depending on the particular "game" for which the system 100 is adapted, the point identification module 124 may determine the beginning and ending of points (or events) differently. For example, in automatically identifying a point within a tennis match, the processor 114 may execute the point identification module 124 to process the video to identify when the players are aligned such that one of the players is about to serve the ball to another player and to mark that frame of the video as the beginning of a point. The point identification module 124 may further cause the processor 114 to scan movement within the subsequent frames to determine a subset of frames within a sequence of frames of the video in which movement of the players slows down, and to mark one of the determined frames as the end of the point. In this example, it may be determined that a point is characterized by the players holding their position relative to the tennis court at the beginning of each point followed by rapid movements of one or both players until the point is ended, at which time both players' movements slow for a period leading up to the next point. The subset of frames that correspond to those repeated sequences of movement may correspond to the point.

In baseball, any of a number of pitches, the changing of the player in the box, and the changing of the offense and defense may mark the end of an at bat. In other games, the events may be identified differently and thus may have different characteristics with respect to the video stream, which characteristics may be monitored to identify the beginning and ending of a point, which beginning and ending define a subset of frames. In some embodiments, the point identification module 124 may include boundary detection or other image processing capabilities, which may be used to map the player position in two-dimensional space to a two-dimensional representation of the field of play. This mapping may then be used to determine when the players are approaching a position or exhibiting behavior indicative of the beginning or ending of a point.

The memory 118 may further include a point annotation module 126 that, when executed, may cause the processor 114 to process the point from the beginning to the end to determine various aspects of the point, including the outcome. In a tennis implementation, for example, the point annotation module 126 may identify a number of times the ball crosses the net (and annotate the video at each such crossing), may annotate subsets of the frames of the point indicating a forehand or backhand, may annotate the video with other information, such as a "forehand winner," "unforced error," and so on. In some embodiments, the point annotation module 126 may also add information to the display, such as the score, or other information. In another sport, such as baseball or softball, the point annotation module 126 may count and annotate each pitch, may annotate the outcome of each pitch (ball or strike), and so on. In the baseball example, the point annotation module 126 may also add a pitch count, score, balls, strikes, and outs indicator to the display.

In a particular embodiment, the point annotation module 126 may, after determining the outcome of a particular event, update the subset of the video frames with an annotation of the outcome. The point annotation module 126 may update each frame of the subset corresponding to an event, a first few frames of the subset, or some, but not all, of the frames of the subset of frames. Other embodiments are also possible.

The memory 118 may include a point verification module 128 that, when executed, may cause the processor 114 to provide a GUI to an administrative device 108 to review a particular point in order to verify the automated decision. In some embodiments, a user may interact with the GUI via the administrative device 108 to annotate the video, correct the automated scoring, or both.

The memory 118 may further include a point disambiguation module 130 that, when executed, may attempt to learn from changes made via the point verification module 128. In some embodiments, the point disambiguation module 130 may mark and possibly guess at the outcome of a particular point before the point verification module 128 provides the video related to the point to the administrative device 108. In some embodiments, the point disambiguation module 130 may be configured to infer data related to the particular point based on the outcome of the game or match.

In some embodiments, the memory 118 may include an analytics module 132 that, when executed, may cause the processor 114 to calculate statistics based on the data collected from the video. In some embodiments, the memory 118 may also include a clips module 134 that, when executed, may cause the processor 114 to organize, assemble or otherwise identify one or more video segments (or video clips) corresponding to a particular parameter (such as forehands, backhands, and so on). In some embodiments, the video processing system 102 may store identifiers associated with the video segments in the memory 118, which identifiers may be used to group or retrieve the video segments for replay.

In some embodiments, the memory 118 may include a graphical user interface (GUI) generator 136 that, when executed, may cause the processor 114 to provide a graphical user interface to a computing device, for example, to receive registration information, video data, payment information, other information, or any combination thereof. In some embodiments, the GUI generator 136 may cause the processor 114 to generate a GUI including at least a portion of the video to an administrative device 108, which may be accessed by an operator to correct, annotate, or otherwise mark portions of the video. The GUI generator 136 may also cause the processor 114 to generate a GUI and to provide the GUI to a computing device 106. The GUI may include the video and a plurality of user-selectable elements that may be accessed by a user to select portions of the video for review, to select between viewing panels to review statistics (for example), and to select segments to mark as favorites for later review or for sharing via social media, for example.

The memory 118 may further include a machine learning module 138 that, when executed, may cause the processor 114 to process the video data, to learn from actions within the video, and to learn from annotations and corrections received from the operator or administrator. In some embodiments, the machine learning module may be configured to tune algorithmic parameters to improve decision-making and to improve initial outputs to reduce errors. In an example, the machine learning module 138 may be able to determine a pattern from the video data, such as a movement indicating a strike made by an umpire in a baseball or softball game, based at least in part on the movements of the players and the repetition of the movement by the umpire over the course of several at bats. In another example, the machine learning module 138 may be able to determine types of pitches or other information over time, which would allow for automated creation of pitch charts, spray charts, and other information for baseball. In some embodiments, the machine learning module 138 may train a plurality of classifiers associated with a stored set of concepts derived from prior annotations of a plurality of videos and from known rules of the sport. The classifiers can be applied to a selected video clip to determine actions within the video and to obtain a score indicating whether or not the selected video clip is representative of the concept associated with a particular classifier. In some embodiments, the machine learning module 138 may learn based solely upon the content of the videos themselves and on whatever metadata or annotations can be associated with the video clip.

The memory 118 may also include a coaching module 140 that, when executed, may cause the processor 114 to evaluate statistical aspects of the match to identify areas for improvement for at least one of the participants. The coaching module 140 may cause the processor 114 to access one or more instructional videos or other training materials and to provide selected training recommendations for a particular participant. In some embodiments, the selected training recommendations may be determined automatically by the coaching module 140 based on similar training or drill recommendations made by the operator in previous, similar situations. In some embodiments, the coaching module 140 may communicate with a coach or trainer via electronic messages or alerts, may receive instructions or training recommendations from the coach, and may communicate the training recommendations to a user.

In some embodiments, the video processing system 102 may provide a hybrid video processing system that includes manual and automated aspects, which may significantly reduce the amount of time that a video editor would need to spend reviewing the video in order to identify the decision moment while automating some of the scoring. In some embodiments, such as before an artificial intelligence engine or machine learning module has sufficient training data to disambiguate unclear outcomes, the hybrid functionality may provide higher accuracy than a completely automated solution, while reducing the effort that would be required by a fully manual editing system.

In some embodiments, the video processing system 102 may be configured to process video from a single video camera, which may have relatively low video quality, particularly with respect to far (or distant) areas of the playing area or court. In some embodiments, the video processing system 102 may analyze the video relative to known dimensions to determine a viewing angle of the video camera in order to determine a two-dimensional arrangement of the players on the playing area or court. For example, in tennis, the dimensions of the court are known, and the relative angle and position of the video camera may be determined from the video. The video processing system 102 may be configured to process the video to determine a two-dimensional position of each player relative to the court and may be configured to determine a state of the point or event (such as, in a tennis match, a start state, an end state, a volley state, and so on) based on the positions of the players relative to the court. Further, the video processing system 102 may determine an end of the event based on the changes in movements of the players, such as the players' movements slowing and the players returning to a start position for a next point.

In some embodiments, the video processing system 102 may determine the outcome of the event within the match and at least some of the subset of frames that correspond to the event may be updated to include a visual overlay indicating the outcome of the event. In a particular embodiment, the visual overlay may be inserted within a portion of the video data such that the overlay does not obstruct the view of the match. In some embodiments, the visual overlay may be inserted within the subset of the video frames beginning near or within a first frame of the subset.

In some embodiments, the video processing system 102 may receive the video as a file via an upload. In some embodiments, the video processing system 102 may receive a video stream and may buffer the video stream and then store the video as a file. In still other embodiments, the video processing system 102 may retrieve the video from a remote storage. In a particular embodiment, the video processing system 102 may retrieve the video from a variety of cloud-based storage systems, such as DROPBOX®, Google® Drive, other on-line storage providers, or any combination thereof.

In certain embodiments, a user may sign up for an on-line storage service. Subsequently, when the user plugs a video camera device into his or her computer, the computer automatically copies the video from the camera to the computer and uploads the video to the on-line storage service. The video processing system 102 may then access the on-line storage service to retrieve the video, either automatically, periodically, or in response to a selection by a user.

In some embodiments, the video processing system 102 may receive the video in any of a variety of formats. Long videos may be received as multiple video files, which may be concatenated to form a single video. In some embodiments, the processor 114 may execute the video ingest module 120, which may cause the processor 114 to accept one or more video files, concatenate the video files (if necessary), and may interact with the GUI generator 136 to provide an interface to prompt a user to provide further information (such as player names, player jersey numbers, and other information).

In some embodiments, the processor 114 may execute the match identification module 122 to process the video to separate match footage from non-match footage. For example, there may be significant non-competition time during which the playing area is empty or which may have players performing warm ups. Further, the processor 114 may utilize the match identification module 122 to process the entire video file to resolve whether the video may include multiple matches. In some embodiments, the match identification module 122 may cause the processor 114 to include pointers or markers within the video file to indicate the start and end of a match. In some embodiments, the match identification module 122 may cause the processor 114 to identify the beginning and ending of an inning (in baseball or softball), for example.

In some embodiments, the point identification module 124 may cause the processor 114 to process the video to identify individual points or events within the match. In tennis or volleyball, a point may refer to a serve. In baseball or softball, a point may correspond to an at bat. In basketball, a point may correspond to a possession by a particular team. In hockey, a point may correspond to a possession that crosses the mid-line of the rink. Depending on the sport, the point identification module 124 may be configured to identify the start and end points demarking an event within the match.

In a particular example involving tennis, the point identification module 124 may use known geometry of a tennis court and identify a pattern of white lines that looks correct. From the identified pattern, the point identification module 124 can use three-dimensional geometry to infer the location and parameters of the camera relative to the playing surface. Once the three-dimensional geometry is determined, the point identification module 124 can find people on the playing surface and accurately estimate their speed and two-dimensional position on the court. In most cases, the camera may be stationary during the match, so the geometric determination of the playing surface may be performed once and reused throughout the match. The geometric information can be used to determine the start and end of individual points.

In a particular embodiment, the players may assume a standard (known) position at the beginning of each point, so the point identification module 124 may be used to detect when the players assume the known positions and may mark that frame in the video as a start of the point. The point identification module 124 may then process the movements of the players within the video to identify when the player movement slows, which slowing down may indicate the end of a point. Once this slowing down is determined, the point identification module 124 may mark the frame within the video as the end of the point. In baseball or softball, the point identification module 124 may detect when a player steps into the batter's box and may mark the frame in the video as a start of a point. Continuing with this example, the point identification module 124 may detect when a new player steps into the batter's box and may back up through the video to determine an end of a previous play. Once the end of the previous play is located, the point identification module 124 may mark the frame within the video as the end of the point. With respect to each possible sport with which the video processing system 102 may be used, the start and end of a point may have different characteristics, which may be utilized to identify the individual points within the video. Recognizing when a new batter enters the batter's box may vary as well, depending on the camera angle, for example. In some embodiments, the batter's number may be detected to identify a next batter. In other examples, a characteristic of the batter (type of bat, batter's gloves, batter's helmet, size of the batter, and so on) may be determined and used to identify when the batter changes.

In some embodiments, the point annotation module 126 may cause the processor 114 to track a plurality of data within each identified point. In a certain embodiment involving tennis, the point annotation module 126 may track and record the serving player and position (near/far, advantage/ deuce); the number of times the ball crossed the net; the last player to hit the ball before the end of the point; whether the ball was hit on the left or right side of the player (or a volley); whether the ball was returned with a forehand or backhand stroke; whether the last hit was a winner, forced error, unforced error, or unknown; and so on. The point annotation module 126 may record the plurality of data in a data file and link the data within the data file to the point within the match. From the plurality of data, the point annotation module 126 may use the plurality of data to deduce rally length, to determine whether the person hit the ball out, to determine whether the person hit the ball into the net, to determine return of serve statistics, to detect aces, and to calculate a host of other statistics and information. In some embodiments, the point annotation module 126 may cause the processor 114 to perform additional annotations within points (or events) to track finer granularity events, such annotating each hit a player makes (within a tennis match), annotating the player's position in two-dimensional space on the court, annotating the ball position, annotating the ball spin (for example based on the racket angle of the hit or based on visual artifacts of the ball detectable within the video), annotating the outcome of the event or point, and so on. In some embodiments, these fine (granular) level annotations may be fully automated.

In some embodiments, the point annotation module 126 causes the processor 114 to produce an estimate that can be then refined based on the rules of the particular sport. In some embodiments, the point verification module 128 may cause the processor 114 to apply particular scoring rules to the estimates to resolve conflicts, to identify inconsistent annotations, and so on. For example, the point verification module 128 may be used to determine that a batter was substituted in the middle of an at bat or that the pitcher was changed during an at bat, causing a long delay that might be incorrectly identified as the end of the point (or at bat), but which marks a new pitcher facing the same batter. In certain embodiments involving tennis, for example, a particular tennis scoring system can be applied to the estimates to resolve conflicts or identify annotations that are not consistent. Such conflicts or inconsistencies may be due to player error (the players forgot the score or decided to diverge from the rules for some reason), or may be due to an error in the annotation. In tennis, scoring systems may generally be consistent, but there may be variables such as ad/no-ad scoring, eight game pro sets, different rules for switching sides on tiebreakers, and so on. Such variations may need to be accounted for, either by allowing for adjustments to the scoring rules via configurable preferences or by allowing for correction of the scoring. In some embodiments, the point verification module 128 may cause the processor 114 to identify potential conflicts/errors and to provide such information to the point disambiguation module 130.

In some embodiments, the point disambiguation module 130 may cause the GUI generator 136 to provide a GUI including a video portion corresponding to the point and an automated annotation of the point for verification by an operator of an administrator device 108 or of a computing device 106. The GUI may enable users to inspect any automated results and quickly correct any errors or ambiguities. Many ambiguities in annotation can be addressed either through automated application of the rules or through presentation to a device for manual correction.

In some embodiments, the analytics module 132 may cause the processor to process the outputs of the annotations into raw statistics. In some embodiments, the analytics module 132 may provide higher level suggestions with regard to how a particular player might improve. In some embodiments, the analytics module 132 may include various drills as well as analytics capabilities, which may analyze the scoring to identify those areas of the game that may provide the biggest gains if improvements are made. In some embodiments, the analytics module 132 may include the capability of comparing current statistics to historical statistics associated with a player, comparing current statistics against other players who played the same opponent, comparing the current statistics to those of other players at the same level, and so on.

In some embodiments, the clips module 134 may cause the processor 114 to process the video after the annotation process is complete in order to remove "uninteresting" material. The uninteresting material may include portions of the video that falls between points, during breaks or time outs, prior to the start of the match, and after the match is over as the players are cleaning up and leaving the playing area.

In some embodiments, the GUI generator 136 may provide an interface including a plurality of user-selectable elements, such as pulldown menus, checkboxes, radio buttons, buttons, clickable links, images, and video controls. The interface may include a video pane configured to display video clips and including one or more user-selectable elements, such as a play button, a pause button, a "slow" button, a next button, a previous button, other buttons, or any combination thereof. The interface may further include a user-control pane including multiple user-selectable elements through which the user may selectively filter which portions of the video to display or to display statistics or even to select favorite video clips. In some embodiments, the user may share one or more video clips via social media by interacting with one or more user-selectable elements of the interface.

In some embodiments, the clips module 134 and the GUI generator 136 may use the Moving Picture Experts Group (MPEG) dynamic adaptive video streaming over hypertext transfer protocol (HTTP) (sometimes referred to as "DASH") or MPEG-DASH standard, which may enable high quality streaming of media content over the Internet from conventional HTTP web servers. The MPEG-DASH standard may work by segmenting the video content into a sequence of small HTTP-based file segments, each segment including a short interval of playback time of a content that is potentially many hours in duration, such as a sports event. In some embodiments, the content may be available in a variety of bit rates (i.e., alternative segments encoded at different bit rates covering aligned short intervals of playback time). In some embodiments, the client may automatically select between alternatives with respect to the next segment to download and play back based on the current network conditions. In a particular example, the client or software application may select a segment with the highest possible bit rate that can be downloaded in time for play back without causing stalls or re-buffering events in the playback.

In some embodiments, the GUI generator 136 and the clips module 134 may utilize the MPEG-DASH standard in a non-standard way. In particular, the clips module 134 may segment the match video into video segments, each of which may correspond to a particular point within the match. By segmenting the video into such segments, the GUI generator 136 may provide one or more user-selectable elements or controls that may allow the user to quickly navigate to arbitrary points within the match in a user-friendly way.

In some embodiments, the video processing system 102 may receive video, process the video into a plurality of segments, determine statistics from content within each of the plurality of segments, and annotate the video with statistical data, scoring information, and other annotations. The video processing system 102 may then provide a GUI including user-selectable elements, which may be accessed by a user to select portions of the video, to review the statistics, and so on.

In an example, a user may control the video processing system 102 via an administrative device 108 to retrieve video of an athletic match (such as a baseball game, a tennis match, and so on) from a data source through the network 110 (or via the I/O interface 116). The video processing system 102 may process the video data to identify the start and end of the match and may further process the video data of the match to identify the start and end of a plurality of points (or events) within the match. The video processing system 102 may truncate or delete portions of the video data that fall outside of the start and end of the match or that fall between the points or events within the match in order to shorten to video and to remove "dead air" time. In some embodiments, the video processing system 102 may automatically segment the video data into a plurality of segments, where each segment corresponds to a point or event within the athletic match. The video processing system 102 may automatically determine information about each point or event and may annotate each point or event with the information. In some embodiments, an operator may correct the annotations or may further annotate the video segments. The video processing system 102 may store the video segments and the associated information and may provide one or more of the video segments or an interface that includes access to one or more of the video segments to a computing device. In some embodiments, at least a portion of the annotated video data may shared with others via a social networking website or via another video streaming website.

Figure 2:
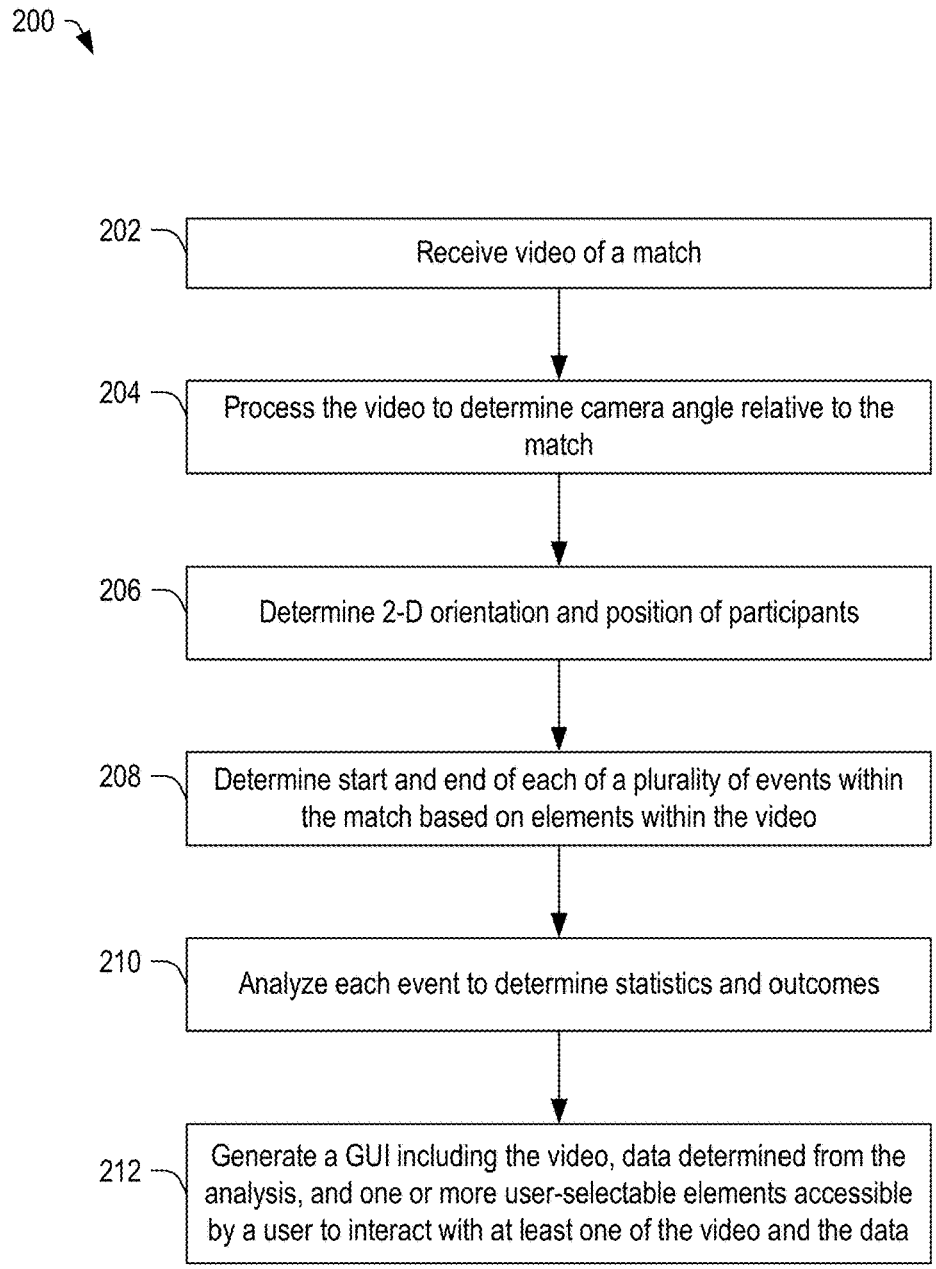
FIG. 2 is a flow diagram of a method of generating a graphical user interface including video and data from processing game videos, in accordance with certain embodiments of the present disclosure.

FIG. 2 is a flow diagram of a method 200 of generating a graphical user interface including video and data from processing game videos, in accordance with certain embodiments of the present disclosure. At 202, the method 200 may include receiving video of a match. The video may be received in a variety of formats. In some embodiments, the video may be uploaded by a user through a network connection or via a direct coupling (such as by coupling a smart phone or thumb drive to the I/O interface 116 (in FIG. 1). In some embodiments, receiving the video may include automatically retrieving the video from a data source, such as a website, a database, or other data source.

The method 200 may include processing the video to determine a camera angle relative to the match, at 204. In some embodiments, the camera angle may be determined relative to known dimensions of a playing area (such as a tennis court) and based on boundaries of the playing surface determined from the video.

The method 200 may further include determining a two-dimensional orientation and position of the participants relative to the playing surface, at 206. In some embodiments, the three-dimensional orientation may be determined first and may be used to determine the two-dimensional orientation of the playing surface and corresponding positions of the players relative to the playing surface.

The method 200 may also include determining a start and an end of each of a plurality of events (points) within the match based on elements within the video, at 208. In an example, a start of a point may be determined based on the position of the players relative to the playing surface, and the end of a point may be determined based on a change in the movement of the players, such as the players slowing down. In a baseball or softball game, the start of a point may refer to an at bat and may be determined based on the batter entering the batter's box, and the end point may refer to a point in the video when a next batter enters the batter's box. Other aspects of the video may also be used to determine the start and end of a particular point or event.

The method 200 may further include analyzing each event to determine statistics and outcomes for each point, at 210. In some embodiments, the method 200 may include counting a number of events within a sequence of frames of the video, determining position of players at different points, and so on. Further, the method 200 may include determining a winning shot, errors, and other aspects of the point or event, including (at least in some embodiments) the score or other aspects of the outcome.

The method 200 may also include generating a GUI including the video, data determined from the analysis, and one or more user-selectable element accessible by a user to interact with at least one of the video and the data, at 212. In some embodiments, the GUI may include statistics as well as selectable elements to control access to one or more video segments or clips. Other embodiments are also possible.

Figure 3:
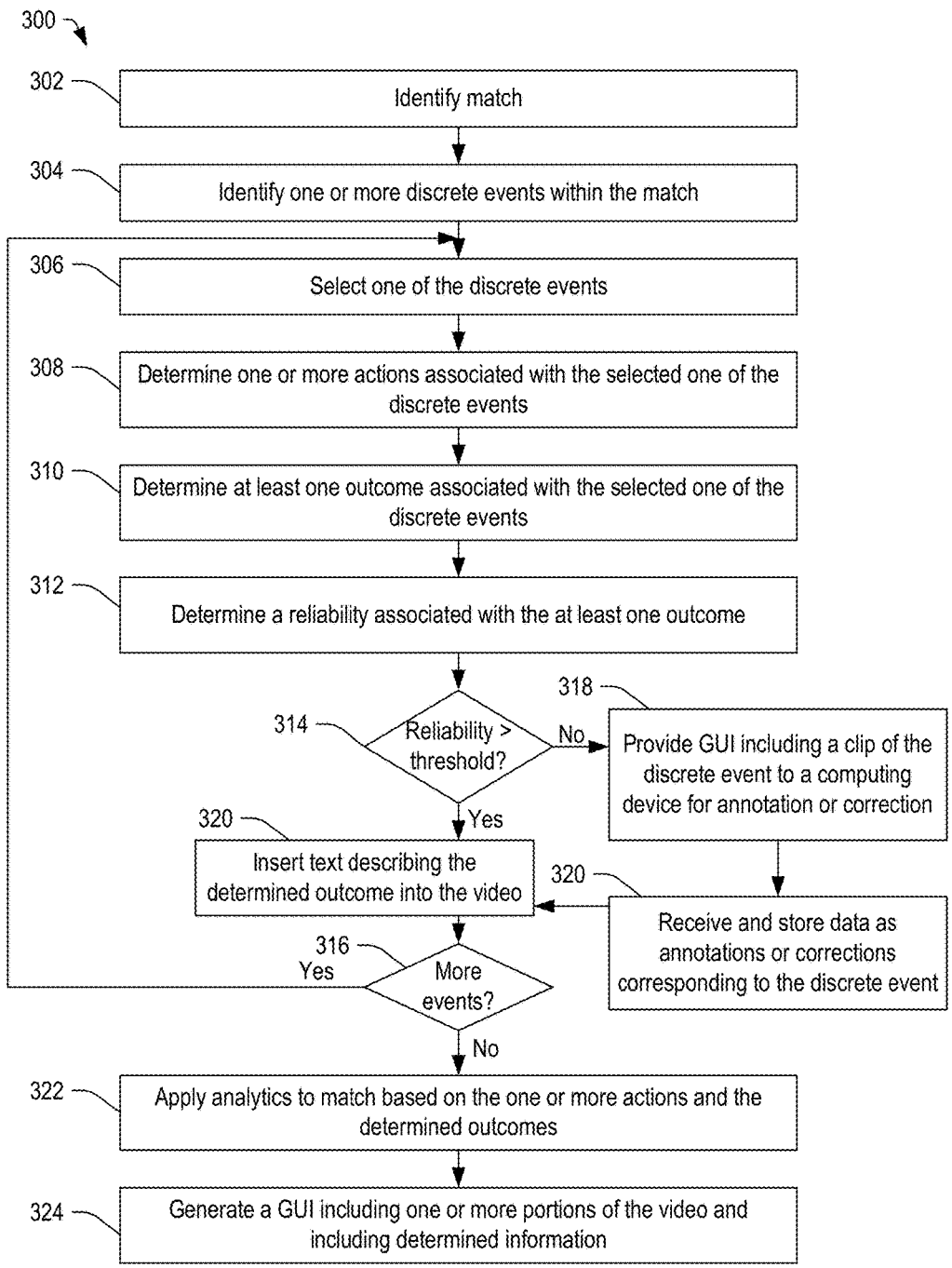
FIG. 3 is a flow diagram of a method of generating a graphical user interface including video and data from processing game videos, in accordance with certain embodiments of the present disclosure.

FIG. 3 is a flow diagram of a method 300 of generating a graphical user interface including video and data from processing game videos, in accordance with certain embodiments of the present disclosure. At 302, the method 300 may include identifying a match within a video. In some embodiments, the start of the match and the end of the match may be determined from the content of the video.

The method 300 may further include identifying one or more discrete events within the match, at 304. The discrete events may correspond to a point or event as previously discussed. The method 300 may also include selecting one of the discrete events, at 306.

In some embodiments, the method 300 may also include determining one or more actions associated with the selected one of the discrete events, at 308. The one or more actions may include characteristics corresponding to movement of a ball, movement of a player, and so on. In an example involving tennis, the one or more actions may include forehand swings, backhand swings, a number of times a ball travels over the net, and so on.

The method 300 may further include determining at least one outcome associated with a selected one of the discrete events, at 310. In some embodiments, determining the outcome may include determining a winner of the particular point. In some embodiments, determining the outcome may include determining whether a batter reached base safely. Other outcomes for other events may also be determined.

The method 300 may include determining a reliability associated with the at least one outcome, at 312. In some embodiments, the reliability may be determined automatically based on the actions of the players, the determined path of the ball, and so on. To the extent that the ball is close to being a fault, the video processor 102 may be uncertain with respect to the outcome.

The method 300 may also include determining if the reliability is greater than a threshold, at 314. In some embodiments, the threshold may be a reliability threshold, such as a percentage. In some embodiments, the automated scoring process may provide results that may be about 80% certain in most instances, and if the determined result falls below 80% reliability, the automated score may be flagged for review.

In some embodiments, if the reliability is greater than the threshold at 314, the method 300 may include determining if there are more discrete events to be processed, at 316. If so, the method 300 may return to 306 to select a next of the discrete events.

Returning to 314, if the reliability is less than the threshold at 314, the method 300 may include providing a GUI including a clip of the discrete event to a computing device for annotation or correction, at 318. A user may interact with the GUI to annotate or correct the automated information. The method 300 may further include receiving and storing data as annotations or corrections corresponding to the discrete event, at 320. Additionally, the method 300 may then include determining if there are more discrete events to be processed, at 316. If so, the method 300 may return to 306 to select a next of the discrete events. Otherwise, at 316, if there are no more events, the method 300 may include applying analytics to the match based on the one or more actions and the determined outcomes, at 322. The analytics may include determining various statistics associated with the match and with each event. In some embodiments, the analytics may also include recommendations of drills and aspects of the game that the player should work on.

In some embodiments, the method 300 may include generating a GUI including one or more portions of the video and including the determined information, at 324. In certain embodiments, the determined information may include filter options for selecting portions of the video for playback. Further, the determined information may include statistics related to the match.

Figure 4:
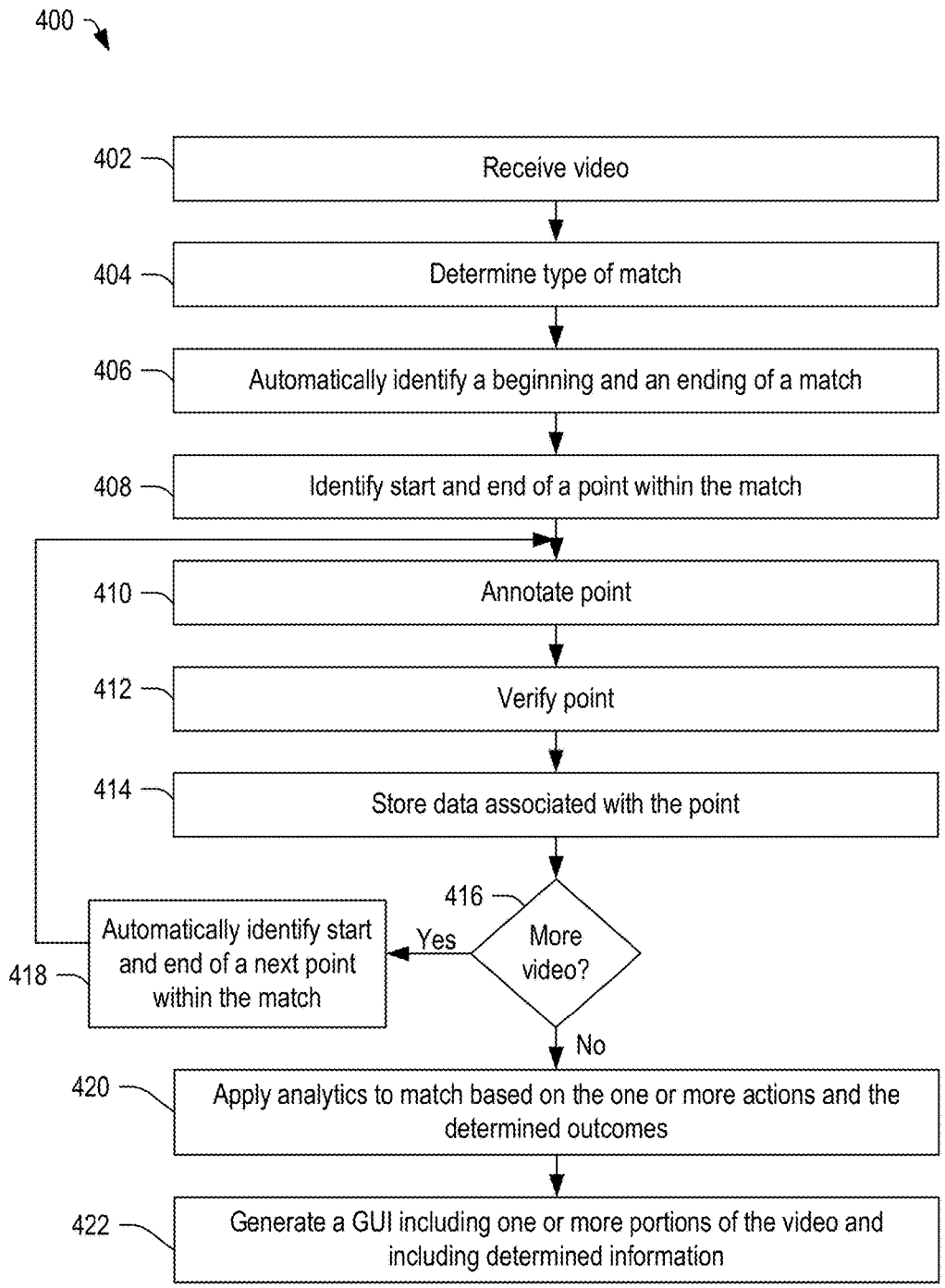
FIG. 4 is a flow diagram of a method of generating a graphical user interface including video and data from processing game videos, in accordance with certain embodiments of the present disclosure.

FIG. 4 is a flow diagram of a method 400 of generating a graphical user interface including video and data from processing game videos, in accordance with certain embodiments of the present disclosure. At 402, the method 400 may include receiving video data. The video data may be received from any number of sources, including a portable hard drive, a website, a local memory, or another source. In some embodiments, the video may be received as a live stream, which may be buffered and stored to a memory. In still other embodiments, the video may be received by retrieving or downloading the video from a data source.

The method 400 may include determining a type of match, at 404. In some embodiments, based on the uniforms, the field shape, the size of the ball, or some other parameter, the method 400 may automatically determine the type of match (i.e., the particular sport or game being analyzed). In some embodiments, determining the type of match may include receiving an input corresponding to a user-selectable element accessible via a GUI.

The method 400 may further include automatically identifying the beginning and the ending of the match, at 406. In some embodiments, the beginning and the ending may be determined from changes in the arrangement of participants relative to the boundaries of the field of play. The method 400 may also include identifying the start and end points of a point or event within the match, at 408. As previously discussed, the start point may be determined based on the position of the players relative to the field of play, and the end point may be identified based on a change in the movement of the players on the field of play, such as when the players slow down, change direction, or reposition themselves relative to the field of play.

The method 400 may also include annotating the point, at 410. The process of annotating may include counting various actions or events, identifying specific aspects within the event, and possibly determining an outcome of the point or event.

The method 400 may further include verifying the point, at 412. The verification process may be configured to apply particular scoring rules to the estimates to resolve conflicts, to identify inconsistent annotations, and so on. In some embodiments, the scoring rules may be determined based on the determination of the type of match. In some embodiments, the scoring rules may be selected from a list of possible scoring rules.

In some embodiments, the method 400 may further include storing data associated with the point, at 414. The data may include statistics and other information derived from automatic analysis of the video segment corresponding to the point. The data may be stored in a table, a database, or a file or may be stored with the video segment.

If there is more video to be processed at 416, the method 400 may include automatically identifying the start and end point of a next point within the match, at 418. The method 400 may then return to 410 to annotate the next point.

Referring to 416, if there is no more video to process, the method 400 may include applying analytics to the match based on the one or more actions and the determined outcomes, at 420. The analytics may include processing the outputs of the annotations into raw statistics. In some embodiments, the analytics may provide higher level suggestions with regard to how a particular player might improve. In some embodiments, the analytics may include various drills as well as analytics capabilities, which may analyze the scoring to identify those areas of the game that may provide the biggest gains if improvements are made. In some embodiments, the analytics may include the capability of comparing current statistics to historical statistics associated with a player, comparing current statistics against other players who played the same opponent, comparing the current statistics to those of other players at the same level, and so on.

The method 400 may also include generating a GUI including one or more portions of the video and including the determined information, at 422. In some embodiments, the determined information may include a box score and other information, which may be displayed on or next to the video to show the score as the game progresses.

In the above-discussion, the start of the point may be determined based on the two-dimensional position of the players at a particular point in the video. The two-dimensional position of the players may be determined from the three-dimensional view determined from the video. An example of a tennis court implementation is described below with respect to FIG. 5 where the two-dimensional court and the player positions are calculated from the video.

Figure 5:
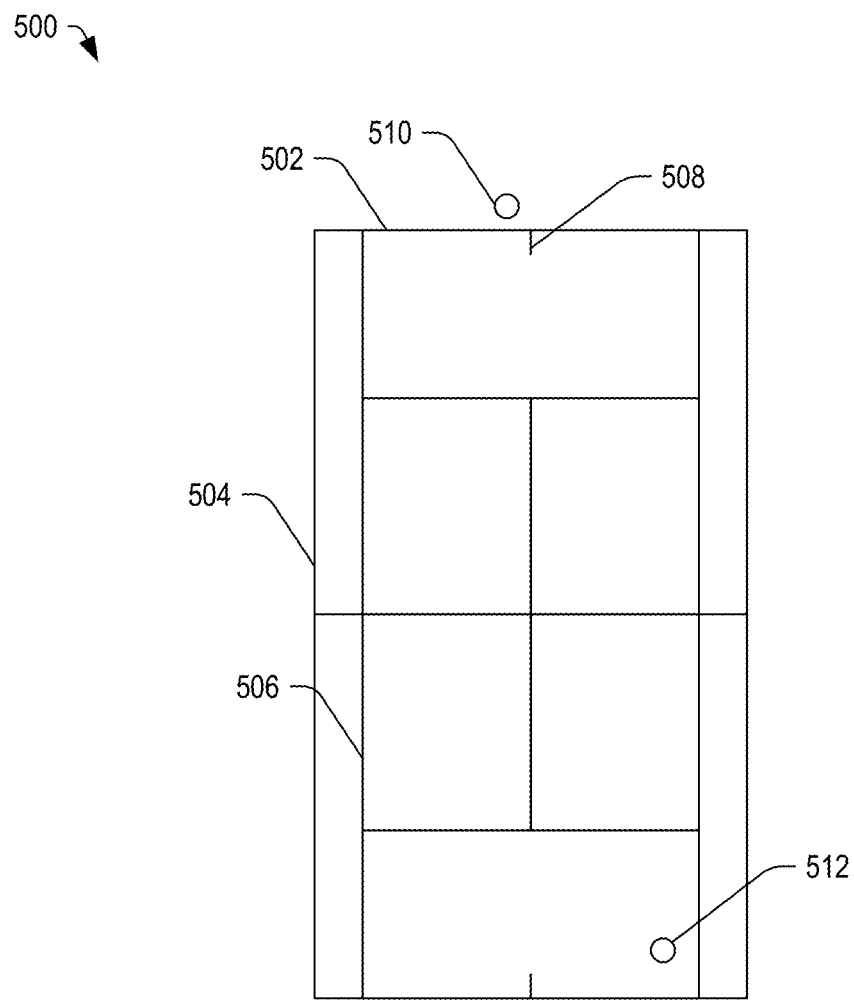
FIG. 5 is a two-dimensional view of a tennis court that may be derived from processing of game videos, in accordance with certain embodiments of the present disclosure.

FIG. 5 is a two-dimensional view of a tennis court 500 that may be derived from processing of game videos, in accordance with certain embodiments of the present disclosure. The tennis court 500 includes the end lines 502, side lines (for doubles 504 and singles 506), and the service line 508. The position of a first player 510 is set to serve, and the position of player 512 is set to return serve. While other positions of the players may be possible, the tennis court 500 and the player positions of players 510 and 512 represent a common configuration at the start of a point.

In some embodiments, the video processing system 102 in FIG. 1 may be configured to process video data to determine a two-dimensional representation of a playing surface based on the video data. In some embodiments, the video processing system 102 may determine a position of the camera relative to the playing surface, process the video data to determine a two-dimensional representation of the playing surface, and process the video to determine the position of players relative to the playing surface.

Figure 6:
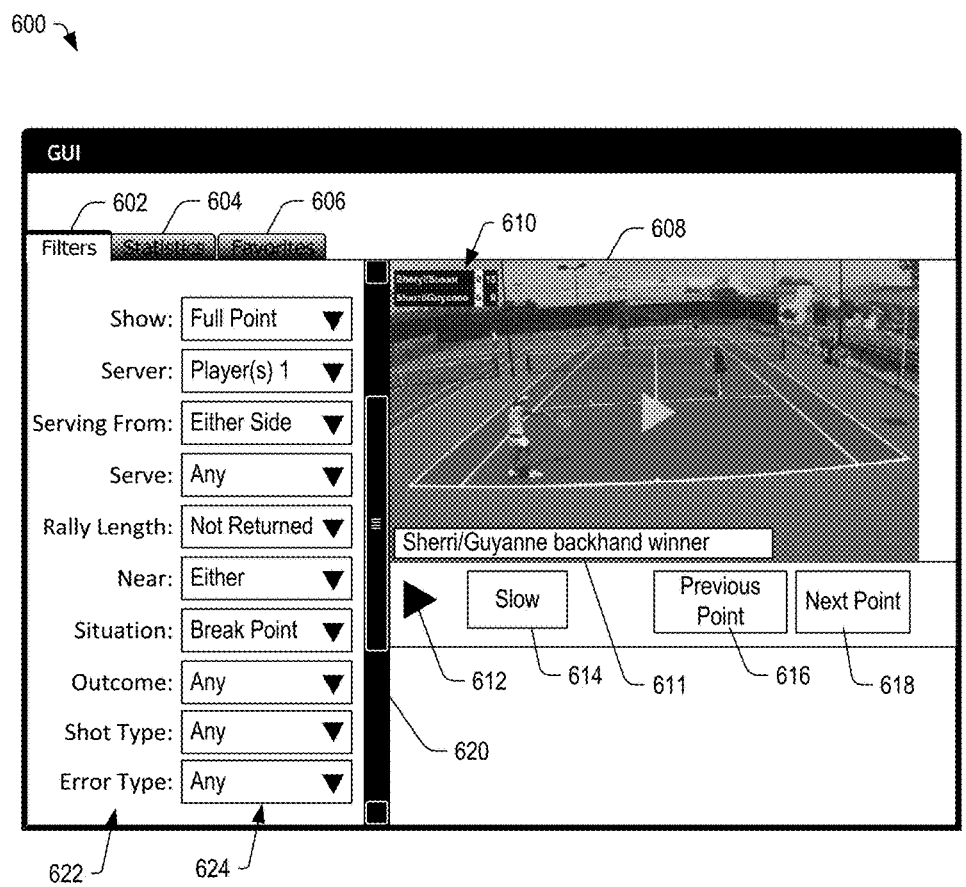
FIG. 6 is a graphical user interface including video data and user-selectable elements accessible by a user to access selected portions of the video data, in accordance with certain embodiments of the present disclosure.

FIG. 6 is a graphical user interface (GUI) 600 including video data 608 and user-selectable elements 624, 612, 614, 616, and 618, which may be accessible by a user to access selected portions of the video data, in accordance with certain embodiments of the present disclosure. The GUI 600 includes a "Filters" tab 602, a "Statistics" tab 604, and a "Favorites" tab 606. The "Filters" tab 602 is selected, which causes the GUI 600 to display a list of parameters 622 and a plurality of user-selectable elements 624 corresponding to those parameters 622. In the illustrated example, the user-selectable elements 624 are shown as pulldown menus; however, the user-selectable elements may include checkboxes, radio buttons, text field, pulldown menus, other elements, or any combination thereof. In the illustrated example, the GUI 600 provides a view into a tennis match; however, the system may provide other GUIs that may be related to other sports, in which case the list of parameters 622 and the selectable elements 624 may be different and more relative to the particular sport.

For example, the parameter "Show" may be aligned to a user-selectable element that may allow the user to select "Full Point", "Start of Point", or "End of Point", in a tennis game. In other games, the situation may be different. Selection of one of these options may cause the GUI 600 to display the video clips corresponding to the selected option. In some embodiments, the GUI 600 may dynamically retrieve the video clips from the server, and the GUI 600 may include one or more identifiers embedded in the code of the page, which identifiers may specify a particular video clip to be displayed. The parameter "Server" may be aligned to a user-selectable element that may allow the user to select "Either", "Player(s) 1", or "Player(s) 2". Selection of one of these options may cause the GUI 600 to display the video clips corresponding to the selected option. In some embodiments, the generic reference "Player(s)" may be replaced by the names of the participants.

The parameter "Serving from" may be aligned to a user-selectable element that may allow the user to select "Either Side", "Far View", or "Near View". Selection of one of these options may cause the GUI 600 to display the video clips corresponding to the selected option, such as video clips showing serves from the "Far View" (opposite to the camera position). At a different camera angle, the options may include "Right Side" and "Left Side". Other options are also possible.

The parameter "Serve" may be aligned to a user-selectable element that may allow the user to select "Any", "First serve" or "Second serve". Selection of one of these options may cause the GUI 600 to display the video clips corresponding to the selected option. The parameter "Rally Length" may be aligned to a user-selectable element that may allow the user to select one or more of "Not Returned", "Short (1-4 shots)", "Medium (5-9 shots)", and "Long (9+ shots)." Selection of one of these options may cause the GUI 600 to display the video clips corresponding to the selected option. Other ranges are also possible.

The parameter "Near" may be aligned to a user-selectable element that may allow the user to select "Either", "Players 1", or "Players 2". Selection of one of these options may cause the GUI 600 to display the video clips corresponding to the selected option. Other options are also possible, such as "Right", "Left", and so on. The parameter "Situation" may be aligned to a user-selectable element that may allow the user to select "Break Point", "Game Point", "Deuce" or "Other. Selection of one of these options may cause the GUI 600 to display the video clips corresponding to the selected option. The parameter "Outcome" may be aligned to a user-selectable element that may allow the user to select "Winners", "Forced Errors" and "Unforced Errors" related to player(s) 1, player(s) 2, or both. Selection of one of these options may cause the GUI 600 to display the video clips corresponding to the selected option.

The parameter "Shot Type" may be aligned to a user-selectable element that may allow the user to select "Forehand", "Backhand", "Volley", etc. Selection of one of these options may cause the GUI 600 to display the video clips corresponding to the selected option. The parameter "Error Type" may be aligned to a user-selectable element that may allow the user to select "Either", "Long", "Net", etc. Selection of one of these options may cause the GUI 600 to display the video clips corresponding to the selected option. In some embodiments, the filter tab 602 may also include a scroll bar 620 to access additional options that may extend past the bottom of the GUI 600.

The GUI 600 may further include a video portion including a video display 608, which may include a box score 610. Further, the video portion may also include video controls, such as a play button 612 (or a pause button once the play button is engaged), a "Slow" button 614 (which may cause the video replay to slow down), a "Previous Point" button 616 (which may allow a user to navigate to a previous point within the match), and a "Next Point" button 618 (which may allow a user to navigate to a next point within the match). Other vide control options may also be possible. In some embodiments, a sound control option may also be provided.

Figure 7:
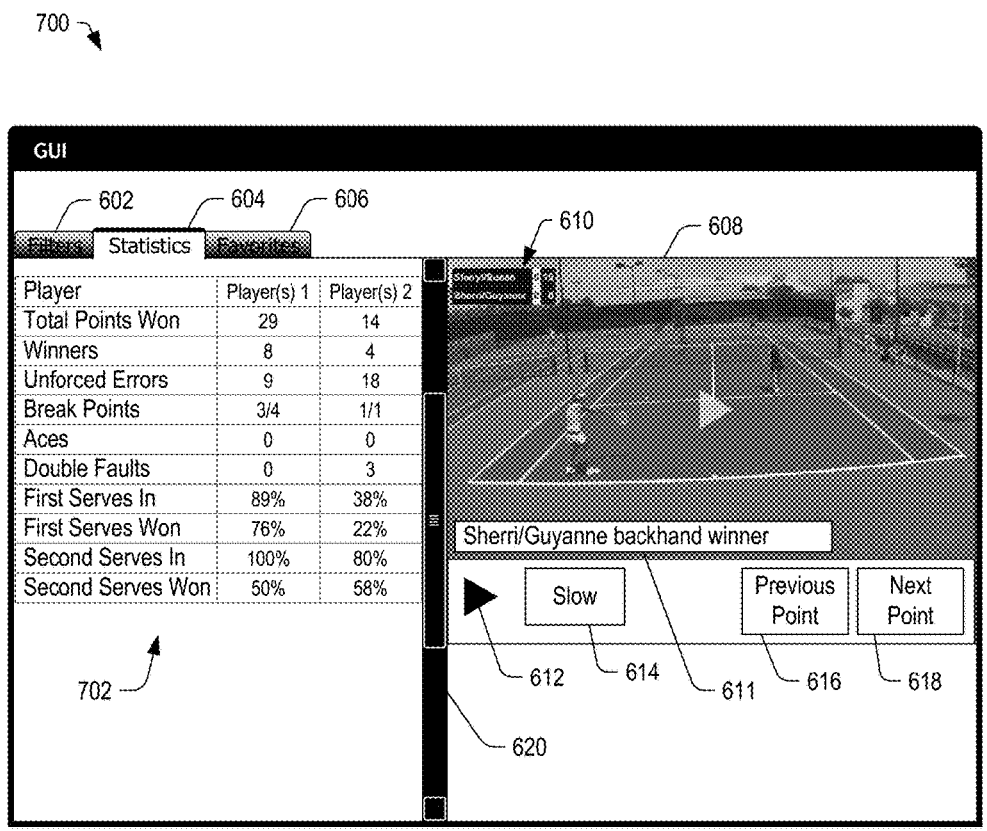
FIG. 7 is a graphical user interface including video data and statistical data derived from the video data, in accordance with certain embodiments of the present disclosure.

FIG. 7 is a graphical user interface 700 including video data 608 and statistical data 702 derived from the video data, in accordance with certain embodiments of the present disclosure. In some embodiments, the user interface 700 may include all of the information of the GUI 600 of FIG. 6, except that the "Statistics" tab 604 is selected.

Selection of the "Statistics" tab 604 may cause statistical data 702 derived from the video 608 to be displayed. The statistical data 702 may include "Total Points Won", "Winners", "Unforced Errors", "Break Points", "Aces", "Double Faults", "First Serves In", "First Serves Won", "Second Serves In", and "Second Serves Won". Other statistics are also possible, such as "Forehand Winners", "Backhand Winners", etc.

Selection of the "Favorites" tab 606 may allow a user to select a clip and to mark the selected clip as a "favorite". Further, from the "Favorites" tab 606, a user may be able to share a selected video clip to a social media site. Other options are also possible.

Although the present invention has been described with reference to preferred embodiments, workers skilled in the art will recognize that changes may be made in form and detail without departing from the scope of the invention.

What is claimed is:
1. A video processing system comprising:
   a processor configured to process video data including a sporting match, and
   a memory accessible to the processor and configured to store instructions that, when executed, cause the processor to:
      determine a start point and an end point of each of a plurality of events within the video data of the sporting match based on the video data;

automatically determine data associated with an outcome of each event of the plurality of events based on the video data, the determined data including a score of the sporting match;
overlay the score onto the video data;
selectively adjust a position of the score within the video data; and
store the determined data and the video data in the memory.

2. The video processing system of claim 1, wherein the memory is further configured to store instructions that, when executed, cause the processor to separate the video into a plurality of video clips, each video clip corresponding to an event of the plurality of events.

3. The video processing system of claim 1, further comprising instructions that, when executed, cause the processor to monitor the positions and movement of one or more objects within the video to determine the start point and the end point of each event of the plurality of events.

4. The video processing system of claim 1, further comprising overlaying at least a portion of the determined data onto the video data.

5. The video processing system of claim 1, wherein the memory further includes instructions that, when executed, cause the processor to select an event from the plurality of events, insert a descriptor indicating an outcome of the selected event within the video data, and store the video data and the descriptor in the memory.

6. The video processing system of claim 5, wherein the descriptor includes at least one of a text description and an icon indicating the outcome.

7. A video processing system comprising:
a processor; and
a memory accessible to the processor and configured to store instructions that, when executed, cause the processor to:
  receive a video of a sporting match, the video including a sequence of frames;
  automatically determine a plurality of events in the sequence of frames based on movement within the sequence of frames, each event corresponding to a subset of frames of the sequence of frames;
  automatically determine data and an outcome of each event of the plurality of events based on the sequence of frames, the determined data includes a score of the sporting match;
  overlay at least a portion of the determined data within the subset of frames corresponding to the event;
  selectively adjust a position of the score within the subset of frames; and
  selectively overlay a descriptor indicating the outcome of a selected event of the plurality of events within the subset of frames.

8. The video processing system of claim 7, wherein the instructions cause the processor to selectively overlay the descriptor within some, but not all, of the subset of frames.

9. The video processing system of claim 7, wherein the instructions further cause
the processor to:
  identify a start frame and an end frame of each event; and
  selectively delete frames between an end frame of an event and a start frame of a next event.

10. The video processing system of claim 7, further including instructions that, when executed, cause the processor to separate the video into a plurality of video clips, each video clip corresponding to an event of the plurality of events.

11. The video processing system of claim 7, wherein the event comprises a point within a tennis match.

12. The video processing system of claim 7, wherein the descriptor includes at least one of a text description and an icon indicating the outcome.

13. A method comprising:
  receiving, at a computing device, a video of a sporting match, the video including a sequence of frames;
  automatically determining, using a processor of the computing device, a plurality of events within the sequence of frames, each event corresponding to a subset of frames of the sequence of frames;
  automatically determining an outcome of each event of the plurality of events;
  automatically determining a score associated with the sporting match at an end of each event of the plurality of events based in part on positions and movement of one or more participants within the video and based in part on a set of rules associated with the sporting match;
  selectively presenting the score within the subset of frames; and
  selectively inserting a descriptor within the subset of frames for each event of the plurality of events, the descriptor indicating the determined outcome of the event.

14. The method of claim 13, wherein selectively presenting the score within the subset of frames comprises:
  displaying the score within the subset of frames; and
  selectively updating the score before a first frame of a next subset of frames in the sequence of frames.

15. The method of claim 13, wherein selectively inserting the descriptor includes inserting at least one of a text description and an icon indicating the outcome within the subset of frames.

* * * * *